Oct. 23, 1945.  J. E. F. GOBIN DIT DAUDÉ  2,387,575
FASTENER FOR DETACHABLY ASSEMBLING TWO PARTS
Filed Oct. 23, 1941
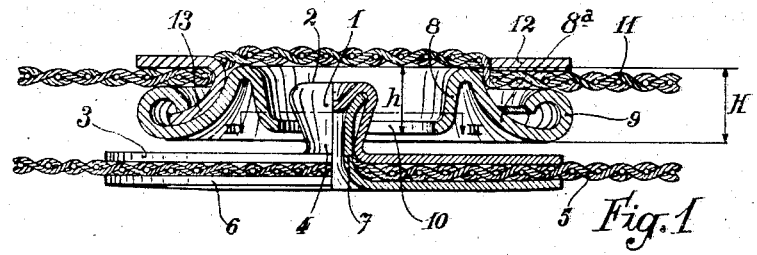
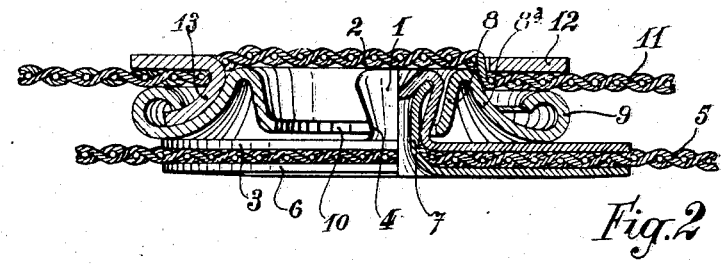
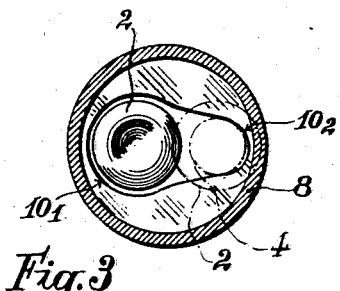
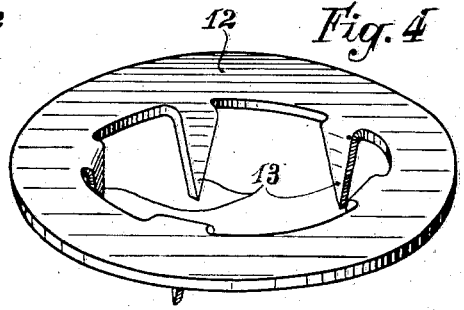
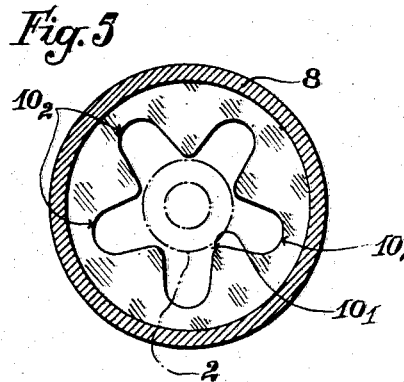
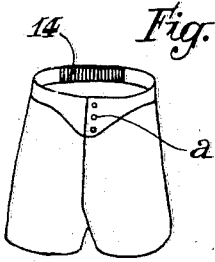
INVENTOR
JEAN EMILE FRANCOIS GOBIN dit DAUDE
BY Bailey, Stephenson & Huettig
ATTORNEYS Patented Oct. 23, 1945

2,387,575

UNITED STATES PATENT OFFICE 2,387,575

FASTENER FOR DETACHABLY ASSEMBLING TWO PARTS

Jean Emile François Gobin dit Daudé, Neuilly-sur-Seine, France; vested in the Alien Property Custodian Application October 23, 1941, Serial No. 416,269
In France April 2, 1941

3 Claims. (Cl. 24—222)

The present invention relates to fasteners for detachably assembling two parts, and in particular two portions of clothing, together, of the type in which a male element such as a stud is to be wedged in a female, or socket, element by relative displacement of said elements transversely to said stud.

The object of my invention is to provide a fastener of this type which is better adapted to meet the requirements of practice than those made for the same purpose up to the present time.

According to a feature of my invention, the female element or socket which accommodates the stud so as to permit this transverse wedging engagement thereof, is secured to the fabric, or other part to be assembled by means of the fastener, through means including at least one projection adapted to be driven through said fabric or equivalent part and deformed by engagement in a suitable locking member, these securing means applying said fabric against the periphery of said female element whereby the fabric covers said female element on the side thereof opposed to that through which the stud is introduced thereinto.

According to another feature of the invention when the article of clothing on which the fastener is mounted is made of a non-elastic fabric, elastic means are provided for urging said stud in wedged relation with said female element.

Other features of the present invention will be hereinafter described with reference to preferred embodiments thereof.

These preferred embodiments will be hereinafter described with reference to the accompanying drawing, given merely by way of example, and in which:

Fig. 1 is a view, partly in elevation and partly in section, of a fastener made according to a first embodiment of the invention, each element being fixed to a fabric, this view corresponding to a relative position of the elements in which the stud is partly introduced into the female element, prior to its being displaced transversely so as to wedge it in fastening position;

Fig. 2 is a view similar to Fig. 1 showing the elements in the position they occupy after this transverse displacement, when the stud is wedged in the female element;

Fig. 3 is a sectional view, on the line 3—3 of Fig. 1, of the inner part of the female element and a front view of the stud.

Fig. 4 is a perspective view showing the member for securing the female elements to the fabric;

Fig. 5 is a view similar to Fig. 3, but corresponding to a modification;

Fig. 6 is a perspective view showing a pair of drawers fitted with fasteners made according to the invention.

The fastener according to the invention as illustrated by the drawing includes two elements, to wit:

a. A male element including a stud 1, integral with a flat base 3; and b. A female element including a frusto-conical portion 8 and a flat wall provided with a slot 10 adapted to cooperate with stud 1.

Stud 1 has a relatively small base or neck 4 and an enlarged head 2. It is hollow and has a frusto-conical side-wall.

The top of the head 2 of the stud is concave so as to form an inward projection of substantially conical shape the base of which is substantially equal in diameter to the maximum inner diameter of the stud head.

This male element is fixed to one of the parts to be assembled through the fastener, for instance to a piece of fabric 5, by means of a flat member 6 adapted to be applied on the opposite face of said piece 5 from base 3. This member 6 carries a central tubular shank 7 adapted to be driven through said fabric 5 into hollow stud 1. When member 6 and base 3 are strongly applied against each other, the upper end of shank 7 is forced against the conical inward projection of stud head 2 and bent outwardly so that parts 3 and 6 are firmly secured to each other (and to fabric 5) in rivet-like fashion.

As for the female element, its frusto-conical inner portion 8 carries an outward flange-like extension including a curved riveting surface 8a and terminating in an annular locking chamber 9. The total height of portion 8a, designated by H on the drawing, is greater than the height h of inner portion 8.

The flat wall which forms the bottom of portion 8 is provided with an elongated slot 10, wider at one end 10₁ than at the other end 10₂. The larger portion 10₁ of the slot is of circular outline (preferably eccentrically positioned with respect to annular portion 8) and its diameter is greater than that of stud head 2, so that said stud head can pass freely through said end of the slot. The smaller portion 10₂ of said slot is of a width smaller than the diameter of stud head 2 and adapted to accommodate the base or neck 4 of said stud. Preferably, the width of the slot decreases gradually from the wider portion $10_1$ thereof toward the narrower portion $10_2$.

The female element of the fastener is secured to the fabric 11 on which it is to be mounted by means of a washer or cap 12 provided with prongs or projections 13 (Fig. 4). Retaining member 12 is applied on the opposite face of fabric 11 from female element 8, and its prongs 13 are driven across said fabric. They bear against the surface 8a of said female element and are deflected outwardly by said curved annular surface, their ends being forced into locking chamber 9. I thus obtain a rivet-like assembly of members 12 and 8 on fabric 11.

It should be noted that with this securing device, fabric 11 is applied against the open end of tubular member 8, which is thus closed.

This fastener will work as follows:

The male and female elements having been secured on the corresponding fabric parts, stud 1 is brought opposite the larger portion $10_1$ of slot 10, and pushed through said portion of the slot into female element 8. This is the position of the parts illustrated by Fig. 1 and Fig. 3 (solid lines). Then the male and female elements are displaced in a direction transverse to the stud, relatively to each other, so that stud neck 4 is wedged in the smaller portion $10_2$ of slot 10. This position is shown by Fig. 2 and the dash-and-dot line of Fig. 3.

In the course of this movement, coaction of the oblique edges of portion $10_2$ of the slot with the conical wall of stud 1 brings the flat base 3 of the male element into contact with the lower edge of surface 8a (Fig. 2). The total thickness of the fastener is thus reduced to a minimum.

It should be noted that, preferably, a certain clearance must be left between stud 1 and the frusto-conical walls of portion 8 of the female element (Fig. 2) and also between the neck 4 of said stud and the end of the smaller portion $10_2$ of the slot (Fig. 3) when neck 4 has wedged against the oblique edges of said smaller portion $10_2$ of the slot.

In order to reduce the diametral dimensions while allowing for this clearance, the apex angles of the stud outer wall and of portion 8 respectively are preferably chosen equal and the smaller portion $10_2$ of the slot extends as far as the line of junction of the frusto-conical wall of portion 8 with the flat wall in which said slot 10 is formed.

In order to reduce the thickness of the fastener, stud 1 is preferably made of a height such that, in the wedged position thereof (Fig. 2), the head 2 of said stud is substantially in contact with fabric 11, that is to say a height substantially equal to the total height of the female element of the fastener. Preferably the above mentioned difference of heights H and h is at least equal to the distance between the upper surface of base 3 and the level at which stud 1 has its smallest diameter for securing the wedging contact of the oblique edges of portion $10_2$ of the slot 10 against the outer conical wall of stud 1.

The portion of fabric 11 which covers the open end of portion 8 of the female element protects said element against the introduction of foreign bodies as might cause jamming of the fastener.

In the modification of Fig. 5, the orifice provided in the flat bottom wall of the female element includes a central portion $10_1$ of a diameter greater than that of the stud and a plurality of radial notches $10_2$ of smaller width. With this construction it is easy to secure the female element in suitable angular position on the fabric. As a matter of fact, the fastener can work properly whatever be the angular position in which the female element is secured to the fabric.

In order to keep the fastener in gripping engagement, when the fabric of the clothing article on which it is mounted is not elastic, I preferably combine with said fastener an elastic member tending to pull the fabric in the desired direction. In the example shown by Fig. 6, this elastic member consists of a spring or elastic strip inserted in the belt of a pair of drawers and the tension of which tends to keep the stud wedged in the slot of the female element.

This spring of elastic strip may be concealed in a suitable sheath provided along the upper edge of the drawers.

If the article of clothing includes a plurality of fasteners a, f. i., three fasteners (Fig. 6), they are disposed preferably along a line substantially at right angles to the direction of the thrust exerted by said elastic means.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A fastener of the type described for detachably assembling two parts together, which comprises, in combination, a male element including a substantially frusto-conical stud, a female element including a substantially frusto-conical hollow portion adapted to accommodate said stud, and a flat wall closing one end of said hollow portion provided with a slot extending substantially to the base of said hollow portion and adapted for wedging engagement with said stud under the effect of a relative sliding of said male and female elements transversely to said stud, the apex angles of said frusto-conical stud and said frusto-conical hollow portion being equal.

2. A fastener according to claim 1 in which the total height of said female element, from the top of said hollow portion to the under face of said flat transverse wall is substantially equal to the height of said stud.

3. A fastener of the type described, for detachably assembling two parts together which comprises, in combination, a male element including a stud having an enlarged head and a restricted neck, a tubular female element of a substantially larger transverse hollow cross section than the transverse cross section of said stud and also having an inner wall surface profile coincidable with an outer surface profile of the stud throughout the length of the latter, and a transverse wall integral with one end of said tubular element and provided with a slot for wedging engagement with said stud, said slot having a larger end of a size greater than said enlarged stud head and eccentrically disposed with respect to said female element, and also having a smaller end terminating substantially at the inner wall of said tubular element whereby the stud can be inserted through the larger end of said slot and the coincidable profile surfaces can be moved transversely of the direction of insertion into engagement with one another.

JEAN EMILE FRANÇOIS GOBIN DIT DAUDÉ.